June 17, 1941.    W. BISSET    2,246,482
LOADING AND UNLOADING APPARATUS
Filed Feb. 12, 1940    6 Sheets-Sheet 5
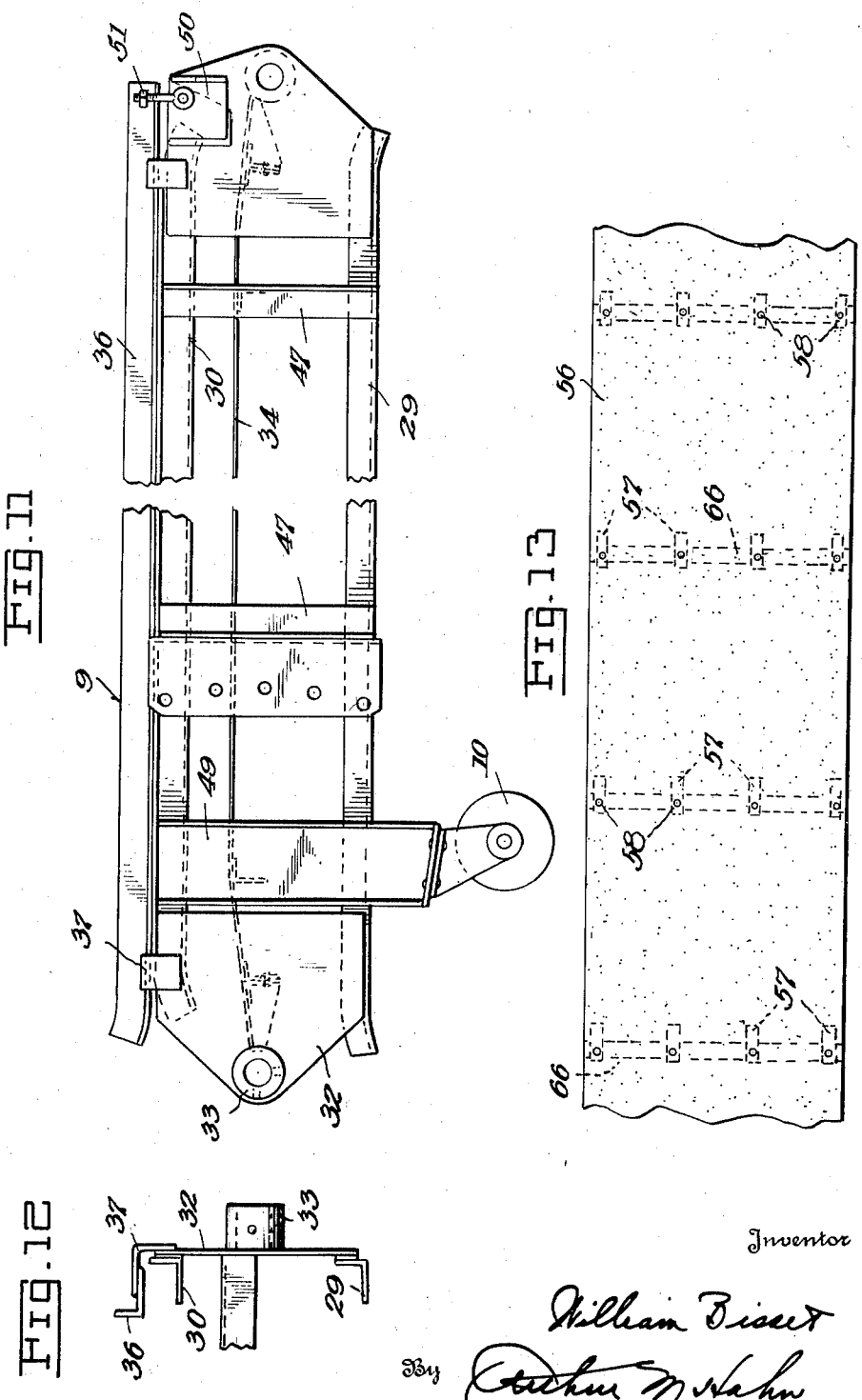
Inventor
William Bisset
Attorney

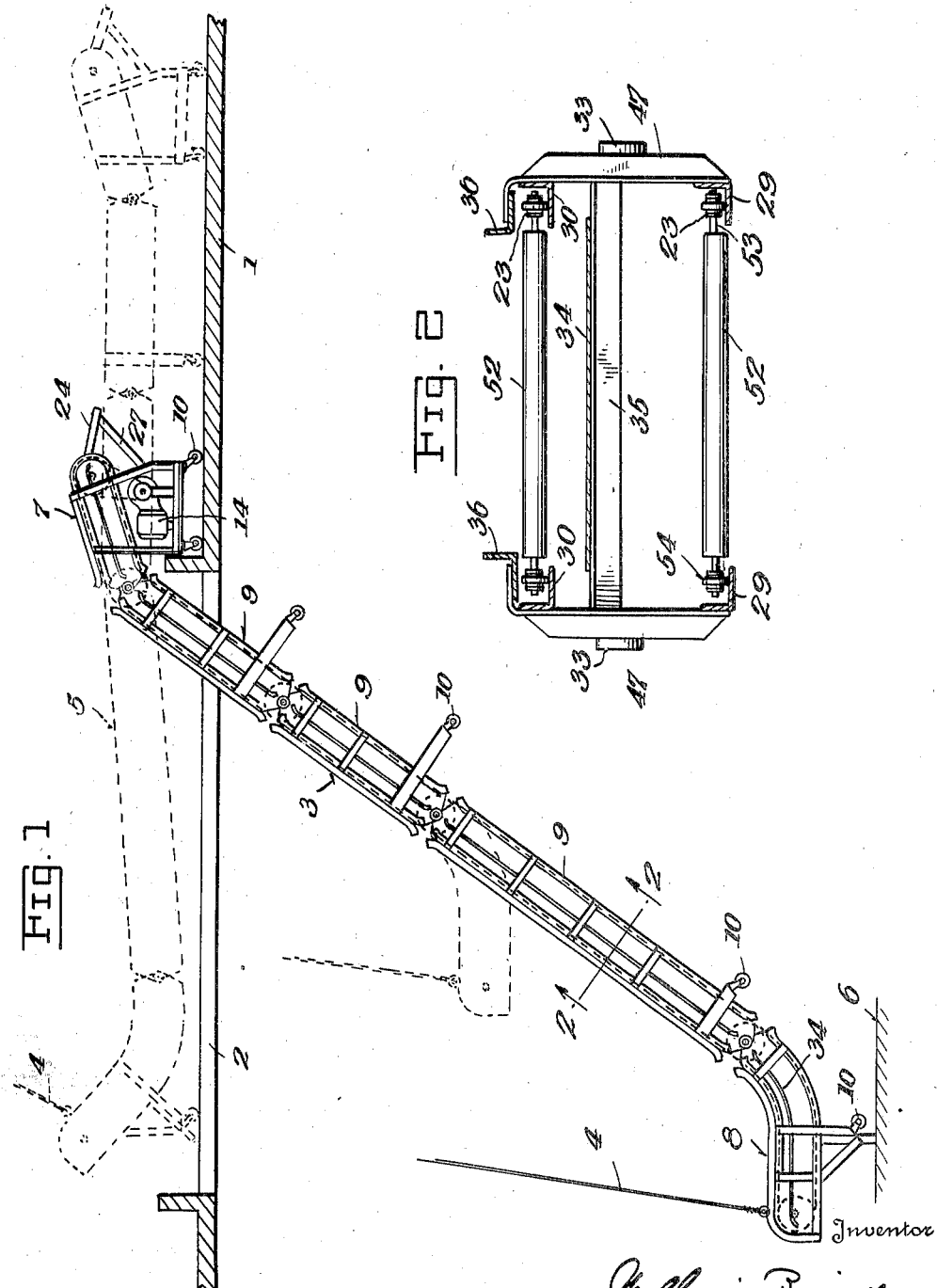

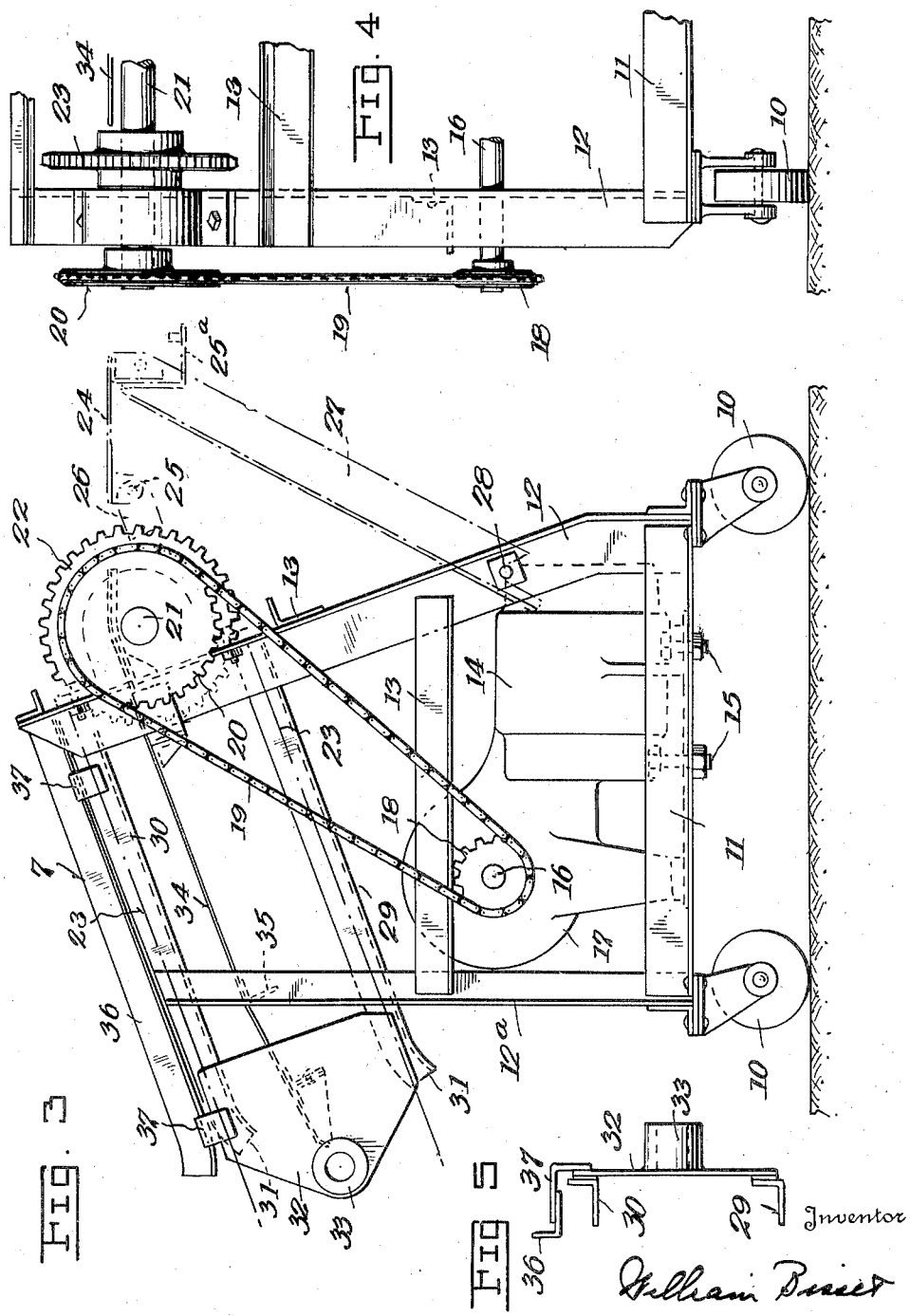

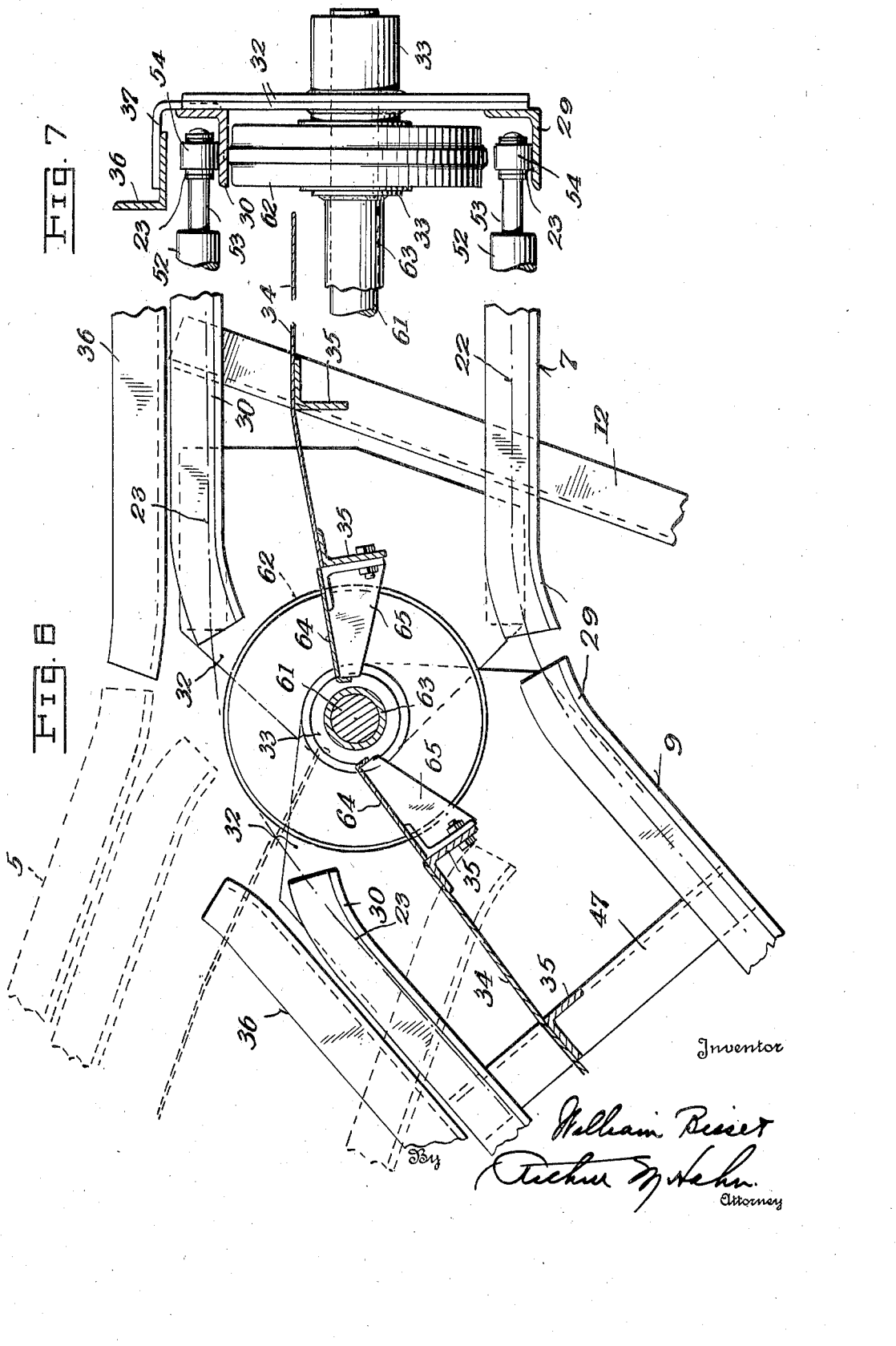

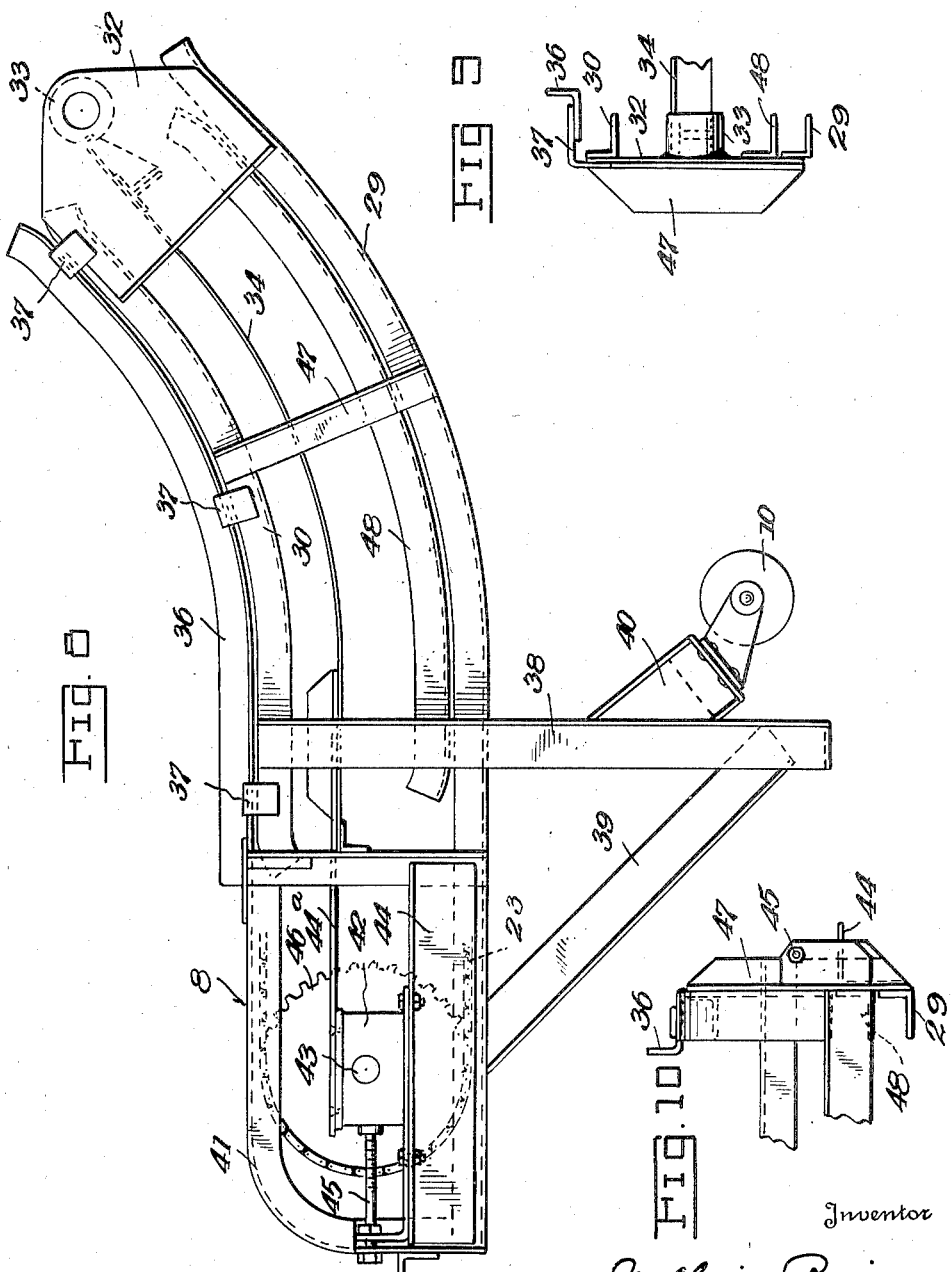

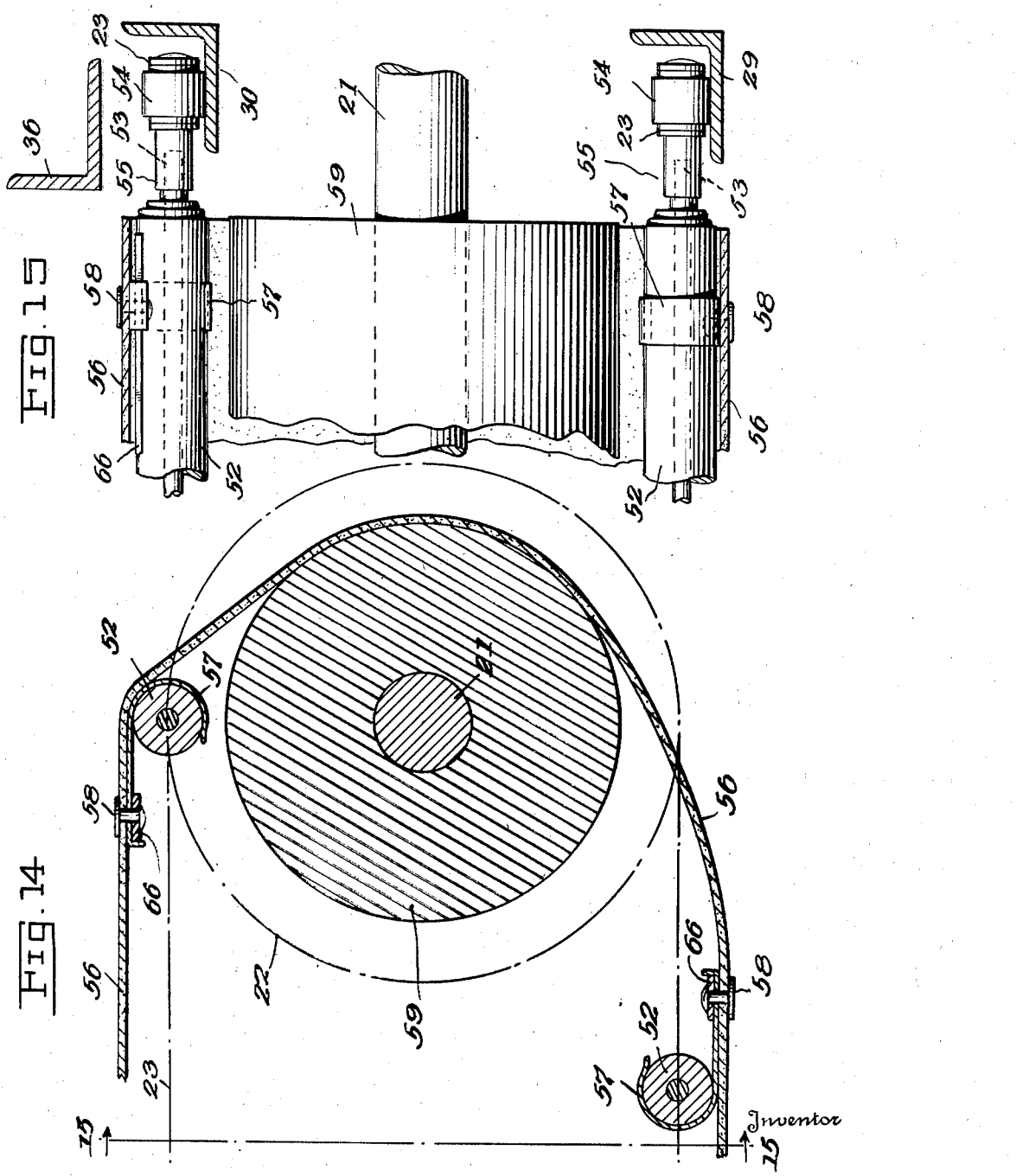

Patented June 17, 1941

2,246,482

UNITED STATES PATENT OFFICE 2,246,482

LOADING AND UNLOADING APPARATUS

William Bisset, Port Hope, Ontario, Canada, assignor to Mathews Conveyer Company, Limited, Port Hope, Ontario, Canada, a corporation of Canada Application February 12, 1940, Serial No. 318,548

6 Claims. (Cl. 198—109)

This invention relates to loading and unloading conveyor apparatus and is directed more particularly to an apparatus for loading and unloading boats.

The herein described apparatus, although capable of general application, was designed primarily for the purpose set forth and described in applicant's co-pending application Serial No. 259,443, filed March 2, 1939, but instead of being particularly applicable for handling bags, the present apparatus is designed especially to handle goods packed in boxes, cartons, crates, and the like.

The apparatus and equipment according to the present invention is mainly applicable for use with ships that are known as between the deck type, which have no winches, and the unloading from the holds thereof must be carried out in some other manner. Heretofore, this operation was generally carried out by stacking up a certain number of cases in a sling, which was pulled up out of the hold with a windlass, and then swung to the side of the ship where the cases could then be transferred to trucks and hauled to the freight shed. With the present invention, the cases are placed on a conveyor which may be projected into the hold of the ship, and this conveyor delivers them to a conveyor line that terminates in the shed from which the cases are either stored or piled onto trucks for distribution to freight cars or motor trucks.

The primary object of the present invention is to provide a loading and unloading apparatus for box and package cargo, although useful also for bagged cargo on carriers, such as ships, which may be easily and quickly projected into or withdrawn from the hold or other cargo space of the carrier.

Another object of the invention is to provide a sectional conveyer of the aforesaid character having a series of spaced pusher bars driven by endless chains, the bars acting to push the boxes and the like along the metal tray of the conveyer.

A further object of this invention is to provide a belt as a removable attachment for quick application to the conveyer to be hooked over the pusher bars so that if the cargo of a ship also includes bagged cargo as a part of the total cargo, it will be possible to first unload the box cargo and then attach the belt and remove the bagged cargo, or vice versa.

With the foregoing and other objects in view, the invention may be stated to consist in the various novel features of construction and arrangement or combination, all of which will be fully described hereinafter and pointed out in the appended claims.

In the drawings accompanying and forming a part of this application, there is shown an illustrative embodiment of the invention in which Figure 1 is a side elevation of an apparatus constructed in accordance with the invention and showing the same in position for loading or unloading a vessel, the dotted lines indicating the apparatus in position to be lowered into the hold of the vessel;

Figure 2 is a cross-sectional view of the conveyer on enlarged scale taken on line 2—2 of Figure 1;

Figure 3 is a side elevation of the motor or head section of the conveyer apparatus;

Figure 4 is a fragmentary end view of the head section of Figure 3 as seen from the right hand end thereof;

Figure 5 is a fragmentary end view of the conveyer part of the head section as seen from the left hand end of Figure 3;

Figure 6 is a fragmentary side elevation with parts in section and illustrating the connection between the head section and an intermediate section;

Figure 7 is a typical fragmentary cross-sectional view of one side of the conveyer;

Figure 8 is a side elevation of the tail end section of the apparatus;

Figure 9 is a fragmentary end view of the right hand end of Figure 8;

Figure 10 is a fragmentary end view of the left hand end of Figure 8;

Figure 11 is a side elevation of an intermediate section of the conveyer apparatus;

Figure 12 is a fragmentary end view of the left hand end of Figure 11;

Figure 13 is a plan view of a portion of the carrying belt attachment;

Figure 14 is a fragmentary longitudinal sectional view showing a portion of the carrying belt in fixed position; and Figure 15 is a fragmentary cross-sectional view of the belt taken on line 15—15 of Figure 14.

Since the present invention is particularly applicable for loading and unloading ships for between the deck operation, the drawings illustrate the conveyer apparatus in operative position between decks. In Figure 1, an upper deck 1 of the ship has a hatch opening 2 through which the conveyer apparatus 3 is suitably lowered by means of a winch (not shown) with the aid of a cable 4 secured to the outer or tail end of the apparatus. The dotted line position 5 indicates the conveyer apparatus in the position on the deck 1 where it has been placed prior to being lowered into the hold, and the full lines indicate the apparatus between the decks 1 and 6 in position to effect a loading or unloading operation.

The conveyer apparatus comprises a plurality of sections operatively connected together and having a motor or head section 7, a tail end section 8 and an intermediate section or sections 9, the number of the latter depending upon the distance between decks or the angular position desired or advisable to meet certain conditions applicable to a certain type or structure of a ship. Each section is suitably provided with casters 10 so that the apparatus may be portable as well as adjustable.

Motor or head section

Figures 3 and 4 illustrate the motor or head section which is suitably constructed in the form of an angle iron framework having base members 11 with uprights 12 and $12^a$ and bracing struts 13, all of which may be bolted, riveted or otherwise secured together. A gear head motor 14, preferably electric, is suitably bolted to the base members 11 by bolts 15 and this motor drives a shaft 16 through a reduction gear 17. A sprocket wheel 18 is securely mounted on the shaft 16 and drives, by a suitable chain 19, a sprocket wheel 20, the latter being mounted on a drive shaft 21 arranged transversely of the head section framework. Secured to this shaft 21 are a pair of laterally spaced sprocket wheels 22 over which are engaged chains 23 that extend longitudinally of the apparatus.

At the discharge end of the conveyer head there is preferably arranged a receiving platform 24 which is adapted to receive the articles from the power driven conveyer and position them substantially level with a gravity conveyer section that is adapted to be connected thereto. The platform 24 is pivotally connected at its inner ends by bolts 25 to arms 26 that extend from the head section framework, and the outer ends of the platform are supported by arms 27 that detachably engage a transverse rod 28 in frame members 12. Also secured to the outer transverse edge portion of the platform 24 are supports $25^a$ which are adapted to receive and support one end of a gravity conveyer section, not shown. This gravity section is of any standard or well known type and forms no part of the present invention.

The guide and supporting members for the conveyer chains 23 and the base or platform on which the boxes or cases slide during conveyance are mounted and secured to the upper ends of the uprights 12 and $12^a$. The guide and supporting members for the conveyer chains include a pair of angle iron members 29, one on each side of the conveyer, for the lower run of each chain 23 and a similar pair of angle iron members 30 for the upper run of each chain. These angle iron members 29 and 30 may be welded or otherwise secured to the uprights 12 and $12^a$ and the end portions thereof are preferably deflected outwardly as indicated at 31, to prevent the chain from striking the ends of the members. An end plate 32 is secured to each pair of members 29 and 30 and is provided with a bearing boss 33, the purpose of which will be explained hereinafter.

A base or platform 34 made of sheet metal, wood, or other suitable material is securely mounted between the upper and lower runs of the conveyer chains 23 and extends across the width of the conveyer. This sheet metal base 34 is mounted on angle iron members 35 that are secured to the conveyer framework, and acts as a platform on which the boxes slide during conveyance. To guide the boxes longitudinally along the conveyer, angle iron guard rails 36 are mounted thereon, by means of suitably spaced angle iron supports 37, on each side adjacent the upper runs of the chains 23 and on each side of the conveyer as clearly illustrated in Figures 3 and 5.

Tail end section

The tail end section is illustrated in detail in Figures 8 to 10 and this section is likewise supported by upright angle irons 38 to which are connected diagonal struts 39 and a short support 40 for the caster 10. An angle iron and frame 41 has bearing blocks 42 slidably mounted therein and in which the shaft 43 is journalled. The bearing blocks 42 are adjustable on the angle iron support 44 by means of screw-threaded bolts 45 and the adjusting plate $44^a$. A pair of sprocket wheels 46 are mounted on the shaft 43 and these sprocket wheels engage the aforementioned chains 23.

This section is also provided with angle iron chain guides 29 and 30, guard rails 36 and supports 37 therefor, end plates 32 and an article supporting platform 34, similar to those described in connection with Figure 3. Side angle iron struts 47 are secured intermediate the ends of the section to maintain the angle iron chain guides 29 and 30 in rigid spaced relation. Due to the curvature of this section an additional angle iron guide member 48 is mounted close to and following the curvature of each lower chain guide 29 for the purpose of guiding the lower runs of the chains 23 along the curved portion of this section of the conveyer.

Intermediate sections

Figure 11 illustrates one of the intermediate sections 9 which may be of any required length and which has parts equivalent to the elements of the head and tail sections. These elements include the aforementioned angle iron chain guide members 29 and 30, the guard rails 36 and the angle iron supports 37 therefor, the article supporting platform or tray 34 and the end plates 32. Suitable supporting uprights 49 are connected to the section and each is provided with a caster 10.

As shown at the right hand end of Figure 11, there is provided a right angle plate 50 to which an eye bolt 51 is secured and by means of which two intermediate sections may be rigidly secured

General details

The endless chain mechanism for moving the articles along the conveyor is illustrated in detail in Figures 2, 7 and 15. This mechanism includes the aforementioned pair of endless chains 23 between which are connected at spaced intervals a plurality of transversely disposed pusher bars 52 each journalled on a shaft 53 and provided at each end with a roller 54 arranged between the side members of the chain links. These rollers are adapted to engage the aforementioned chain guides 29 and 30. A slight modification of the pusher bar structure is illustrated in Figure 15 wherein a stub shaft 55 projects from each roller 54 and this stub shaft is socketed to receive the end of shaft 53. It will be understood that the pusher bars 52 are adapted to engage behind the articles to be conveyed and move them along the article supporting platforms 34.

Where boxes and other rigid articles are to be moved, the aforementioned pusher bar conveyer is used, however, it often happens that a part of the cargo will include bags and other non-rigid articles which cannot be easily moved by this type of conveyor. In order that mechanism may be used for moving the latter type of cargo, I provide a detachable apron or belt which may be connected to the pusher bars 52 to convert the pusher bar conveyer into a belt type conveyer. As shown in Figures 13, 14 and 15, a belt 56 of any suitable flexible material is provided on its inner surface with a plurality of metal hooks 57 arranged in transverse spaced relation at points coinciding with the pusher bars 52. These hooks are secured to the belt in any suitable manner as by rivets 58 and a reinforcing clamping bar 60. The belt is applied by engaging the hooks 57 over the pusher bars 52, and at each end of the conveyer, a drum 59 is journalled on the shaft 21 to serve as a guide for the belt.

In Figure 6, there is illustrated the pivotal joint between the head section 7 and the adjacent intermediate section 9. The two sections 7 and 9 are positioned end to end, with the end plates 32 of the head section and their outwardly extending bearing bosses 33 outside of the corresponding end plates 32 and inwardly projecting bosses 33 of the intermediate section. A shaft 61 extends through the aligned bearing bosses 33 and pivotally connects these sections together. Preferably, a spacing sleeve 63 is interposed between the inwardly projecting bearing bosses 33. As shown in detail in Figure 7, a guide roller 62 is journalled on each inwardly projecting bearing boss 33 and these rollers serve to align the chains with the angle iron guides 29 and 30 as they pass from one section to the other. The article supporting platform 34 of these two sections are each provided with a detachable extension 64 that is carried by an angle iron bracket 65 which is bolted to a transverse angle iron 35 carried by the projecting end of the support 34. As shown in Figure 6, these extensions project relatively close to the spacing sleeve 63 to insure passing of the boxes or other articles smoothly from one section to the other.

Operation

The conveying apparatus is pushed from the shed or other storage space onto the ship, such movement being facilitated by the ground engaging casters 10. The apparatus is placed adjacent the hatch 2 through which the cargo is to be loaded or unloaded, and the tail end section 8 is lowered into the hold of the ship by cable 4 to the deck 6 or other cargo space. While the tail end section 8 is lowered into the hold, the intermediate sections 9 are simultaneously moved forward and successively lowered through the hatch until the tail end section reaches the desired depth. The pivotal connections between the various sections make it possible to project the conveyer through a comparatively small opening (hatch) to any desired depth. The head section 7 remains on deck 1 and by reason of the pivotal connection between the head section and the adjacent intermediate section 9, the conveyer extends at an incline between the two levels 1 and 6. After the conveyer is in position, the intermediate sections are locked to one another and held rigidly in position by the eye bolts 51 and plates 50. It will be understood that it is contemplated to use additional conveying apparatus (not shown) at either the head or tail section or at both ends of the apparatus to facilitate the moving of the cargo from ship to shore or vice versa, and such additional conveying apparatus may involve gravity conveyers or power driven conveyers as the occasion demands. Assuming the cargo is to be unloaded, the motor 14 on the head section is now started which causes the chains and pusher bars 52 to move upwardly over the supporting platform 34 and return along the lower side of the sections. Boxes, packages and similar articles of the cargo are placed on the supporting platform 34 of the tail section and the moving pusher bars 52 engage these articles to convey them upwardly and over the head section 7 where they are discharged onto platform 34. From this point the articles are transported or conveyed in any suitable manner to the warehouse, trucks or points of discharge.

After the boxes and packages are discharged, and should the cargo include bagged material, the apparatus is stopped and the aforementioned belt 56 is fastened to the pusher bars 52, thereby converting the apparatus into a belt conveyer which is capable of conveying this class of cargo.

The apparatus may be used equally well for loading by merely reversing the direction of rotation of motor 14 or by driving the conveyer chains 23 in an opposite direction through any suitable mechanical arrangement.

While the apparatus is particularly useful for loading and unloading vessels, it is obvious that it is not confined to such use as it may be readily adapted for transferring articles from one level to another, as for example, from one floor to other floors of a building, and similar uses.

What I claim is:

1. An apparatus of the character described comprising a head section, a tail end section, and a plurality of intermediate sections, said sections being relatively short and pivotally connected together to form a flexible articulated conveyer adapted to be readily lowered section by section through a hatch opening in the deck of a vessel to a lower deck thereof, said head section and said tail end section when in position being disposed substantially horizontally on the respective decks with said intermediate sections extending at an inclined angle therebetween to form a continuous framework between said decks, and an endless conveyer movable along said framework in a continuous path to transport articles between said decks.

2. An apparatus of the character described comprising a head section, a tail end section, and a plurality of intermediate sections, said sections being relatively short and pivotally connected together to form a flexible articulated conveyer adapted to be lowered section by section through a hatch opening in the deck of a vessel to a lower deck thereof, said head section and said tail end sections when in position being disposed substantially horizontally on the respective decks with said intermediate sections extending at an inclined angle therebetween to form a continuous framework between said decks, a platform carried by and substantially co-extensive with each of said sections, said platforms forming a smooth and substantially continuous surface extending along said framework and adapted to receive and support articles to be transported between said decks, the platform carried by said tail end section having a horizontal portion for receiving and discharging articles and an upwardly curved portion to gradually tilt articles being moved thereover to facilitate their transfer between said horizontal portion and the inclined platforms of the intermediate sections, and an endless conveyer movable along said framework including transversely disposed pusher bars to engage the articles and slide them along the surface formed by said platforms to convey said articles between said decks.

3. An apparatus of the character described comprising a head section, a tail end section, and a plurality of intermediate sections, said sections being relatively short and pivotally connected together to form a flexible articulated conveyer adapted to be readily lowered section by section through a hatch opening in the deck of a vessel to a lower deck thereof, said head section and said tail end section when in position being disposed substantially horizontally on the respective decks with said intermediate sections extending at an inclined angle therebetween to form a continuous framework between said decks, means for positively connecting said intermediate sections together to hold the inclined portion of said framework rigid, and an endless conveyer movable along said framework in a continuous path to transport articles between said decks.

4. An apparatus of the character described comprising a head section, a tail end section, and a plurality of intermediate sections, said sections being relatively short and pivotally connected together to form a flexible articulated conveyer adapted to be readily lowered section by section through a hatch opening in the deck of a vessel to a lower deck thereof, said head section and said tail end section when in position being disposed substantially horizontally on the respective decks with said intermediate sections extending at an inclined angle therebetween to form a continuous framework between said decks, a platform carried by and substantially coextensive with each of said sections, said platforms forming a smooth and substantially continuous surface extending along said framework, means for positively connecting said intermediate sections together to hold the inclined portion of said framework rigid and the platforms carried by said intermediate sections in substantially longitudinal alignment, and an endless conveyer movable along said framework including transversely disposed pusher bars to engage the articles and slide them along said platforms.

5. An apparatus of the character described comprising a head section, a tail end section, and a plurality of intermediate sections, said sections being relatively short and pivotally connected together to form a flexible articulated conveyer adapted to be lowered section by section through a hatch opening in the deck of a vessel to a lower deck thereof, said head section and said tail end sections when in position being disposed substantially horizontally on the respective decks with said intermediate sections extending at an inclined angle therebetween to form a continuous framework between said decks, a platform carried by and substantially co-extensive with each of said sections, said platforms forming a smooth and substantially continuous surface extending along said framework and adapted to receive and support articles to be transported between said decks, and an endless conveyer movable along said framework including transversely disposed pusher bars to engage the articles and slide them along the surface formed by said platforms to convey said articles between said decks.

6. An apparatus of the character described comprising a head section, a tail end section, and a plurality of intermediate sections, said sections being relatively short and pivotally connected together to form a flexible articulated conveyer adapted to be readily lowered section by section through a hatch opening in the deck of a vessel to a lower deck thereof, said head section and said tail end section when in position being disposed substantially horizontally on the respective decks with said intermediate sections extending at an inclined angle therebetween to form a continuous framework between said decks, a pair of endless chains movable along said framework in a continuous path, a plurality of transversely disposed and longitudinally spaced elements interconnecting said chains, and an endless flexible belt to receive and convey articles between said decks, said belt having a plurality of hooks secured thereto to engage said elements whereby said belt may be readily attached to and detached from said conveyer.

WILLIAM BISSET.